UNITED STATES PATENT OFFICE.

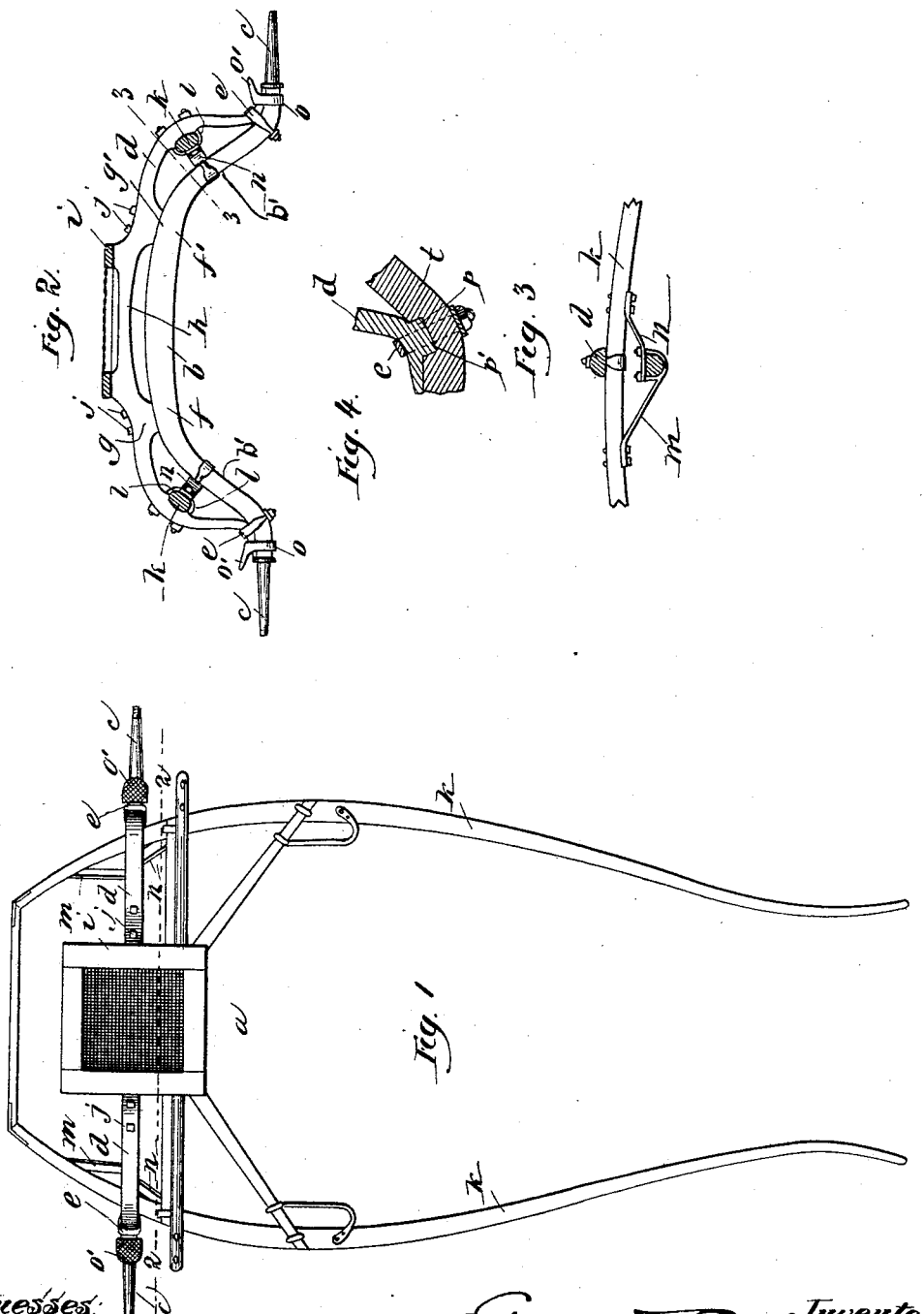

EDWARD S. FRAZIER, OF AURORA, ILLINOIS.

SULKY.

SPECIFICATION forming part of Letters Patent No. 481,556, dated August 30, 1892.

Application filed March 19, 1892. Serial No. 425,633. (No model.)

*To all whom it may concern:*

Be it known that I, EDWARD S. FRAZIER, a citizen of the United States, residing at Aurora, in the county of Kane and State of Illinois, have invented certain new and useful Improvements in Sulkies, of which the following is a specification, reference being had to the accompanying drawings, in which—

Figure 1 is a top or plan view. Fig. 2 is a vertical cross-section on line 2 2 of Fig. 1. Fig. 3 is a section on line 3 3 of Fig. 2, and Fig. 4 is a vertical section through a portion of the axle.

My invention relates to sulkies, and more particularly to sulkies used on the track for racing purposes. In sulkies of the above-described class it is very desirable that the horse should be hitched as close to the vehicle as possible, and to do this it is necessary that the axle of the sulky should be curved upward. By thus curving the axle its strength is greatly weakened, and especially at that portion of the axle which is more nearly perpendicular.

The principal object of my invention is to provide means for bracing this rising or nearly perpendicular portion of the axle, so that it may be strengthened sufficiently to endure all strain which may come upon it.

Another object of my invention is to provide an improved step which will serve to protect the hub of the adjacent wheel to prevent its becoming marred by the shoe when used in mounting.

I accomplish these objects as hereinafter specified, and as illustrated in the drawings.

That which I regard as new will be pointed out in the claims.

In the drawings, $a$ indicates the body of the sulky, of which $b$ is the axle, curved upward about as shown in Fig. 2. The ends of the axle $b$ carry spindles $c$ for the wheels.

$d$ indicates a tie-bar, which is used to strengthen the axle $b$. The tie-bar is secured at its lower ends upon the ends of the axle $b$, near the base of the spindles $c$, by means of clips $e$ or in any other suitable manner. The parts may be finished off so that they will fit closely upon each other to form a smooth joint, as shown. The tie-bar $d$ extends over the axle $b$ and rests upon it at about the points $f f'$, as best shown in Fig. 2, projections $g g'$ being preferably provided for that purpose. The portions of the tie-bar $d$ lying between the projections $g g'$ and the ends are curved, the degree of curvature being greater than that of the rising portion $b'$ of the axle which lies between them, as shown, whereby they serve as trusses to strengthen the axle $b$ at these points.

$h$ indicates a connecting-strip, which is preferably a portion of the tie-bar $d$ and extends over the axle $b$ between the projections $g g'$, which strip serves as a support for the seat-frame $i$. The seat-frame $i$ is rigidly secured upon the tie-bar $d$ in any suitable manner.

$j$ indicates bolts for securing the tie-bar $d$ upon the axle $b$ at the points $f f'$.

If desired, instead of making the tie-bar $d$ a single continuous one, as shown, that portion between the projections $g g'$ may be removed, their ends being then connected only by the seat-frame $i$, or the tie-bar may be formed of two pieces united at the center. By the construction shown the sections of the tie-bar $d$ between the points $g g'$ and the adjacent lower ends of the tie-bar act as trusses to strengthen the rising portion of the curved axle $b$ and a great degree of strength is secured.

$k$ indicates the shafts, the rear ends of which pass under the tie-bar $d$ at the sides of the sulky and are secured thereto by clips $l$ or in any other suitable manner.

$m$ indicates a brace which extends rearward from the under portion of the axle $b$ to the shaft $k$, and $n$ indicates a brace which extends forward from the upper portion of the axle $b$ to the shaft $k$. Braces $m$ and $n$ are provided at each side of the sulky, as shown in Figs. 2 and 3. By this method of attaching the braces to the axle, one projecting from the under side and the other from the upper side of the axle, the tendency of the axle to twist or roll at this point when the front edges of the wheels are spread, as in fast driving, is entirely overcome.

While the shafts are shown as secured to the inside of the tie-bar $d$, they may be secured to the outside thereof with good results, although the construction shown is preferred.

$o$ indicates a step, the upper portion $o'$ of which projects above and over the spindle which carries the hub of the wheel and serves to protect the inner portion of the hub from being marred by the shoe when used. The lower part of the step o is formed like an ordinary axle-clip.

Instead of arranging the braces m and n as shown, the brace m may be connected to the upper side and the brace n to the under side of the axle, as it is evident that such change would not affect their operation.

In order to firmly secure the lower ends of the tie-bar d upon the axle, I provide the tie-bar with tenons or tongues p, one on the under side of each of the lower ends of the tie-bar, which tongues are adapted to fit into recesses p', formed in the upper side of the axle, as best shown in Fig. 4. The clips e are preferably secured over the tongues p, as shown. By this construction the ends of the tie-bar are firmly secured upon the axle and are not readily moved out of place.

That which I claim as new, and desire to secure by Letters Patent, is—

1. The combination, with a high curved axle b, having the rising portions b', of a truss-bar d, elevated above the axle and having projections g g' on its under side which rest upon the upper side of the axle, said truss-bar having its ends connected with the axle adjacent to the spindles thereof and between the latter, and the said projections formed with a degree of curvature greater than that of the said rising portions of the axle, a seat-supporting frame i, mounted on the truss-bar, and the shaft k, secured to the truss-bar above the axle, substantially as described.

2. The combination, with an axle b, of a bent truss-bar d, secured to the axle near the ends thereof and rising over and resting upon the upper portion of said axle, and shafts k, extending between the rising portions of the truss-bar and the axle and secured to the truss-bar above the axle, substantially as described.

3. The combination, with a high curved axle b, having the rising portions b', of the truss-bar d, mounted upon the upper side of the axle and extending over but elevated above the rising portions thereof, the degree of curvature of the truss-bar being greater than that of the said rising portions of the axle, the shafts k, secured to the said elevated portions of the truss-bar above the rising portions of the axle, and braces m n, connecting the shafts with the rising portions of the axle, substantially as described.

4. The combination, with an axle b, of a tie-bar d, resting upon said axle, the lower ends of the tie-bar being secured upon the lower ends of the axle, shafts k, secured to said tie-bar, and braces m and n, substantially as described.

5. The combination, with a curved axle b, of a tie-bar d, the ends of which are secured to the opposite ends of the axle b and the upper portion of which rests upon the axle, of tongues p, formed on the lower ends of said tie-bar, grooves p' in said axle, adapted to receive said tongues, and clips for securing the ends of said tie-bar upon the axle, substantially as described.

EDWARD S. FRAZIER.

Witnesses:
A. H. ADAMS,
CHAS. E. PICKARD.